July 15, 1952     G. T. MARKEY     2,603,182
INCUBATOR AND HATCHER

Filed July 15, 1946     5 Sheets-Sheet 1

INVENTOR.
GEORGE T. MARKEY
BY
ATTORNEY

INVENTOR.
GEORGE T. MARKEY
BY
ATTORNEY

July 15, 1952　　　G. T. MARKEY　　　2,603,182
INCUBATOR AND HATCHER
Filed July 15, 1946　　　　　　　　　　5 Sheets-Sheet 5
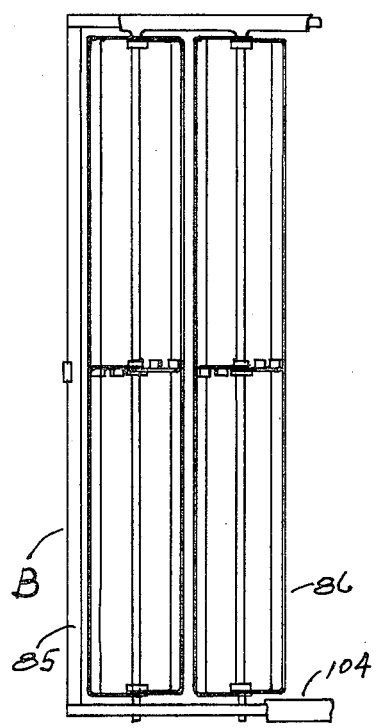
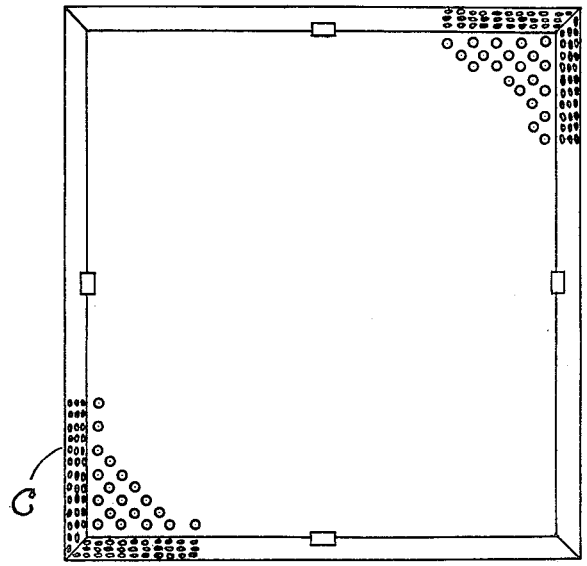
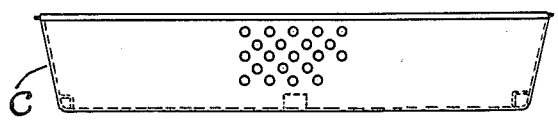
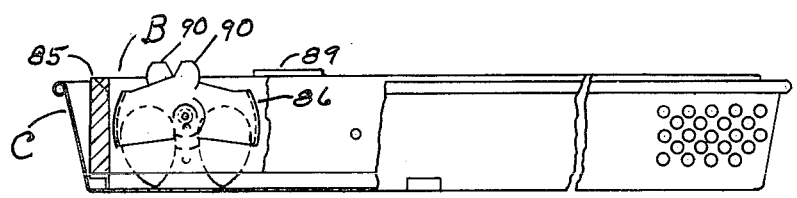
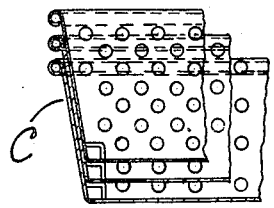
INVENTOR.
GEORGE T. MARKEY
BY
ATTORNEY Patented July 15, 1952

2,603,182

UNITED STATES PATENT OFFICE 2,603,182

INCUBATOR AND HATCHER

George T. Markey, Fort Atkinson, Wis., assignor to James Manufacturing Company, Fort Atkinson, Wis., a company of Wisconsin Application July 15, 1946, Serial No. 683,745

4 Claims. (Cl. 119—37)

1

The present invention relates to a combination incubator and hatcher particularly adapted for use on the single stage principle as shown and described in Patent #2,352,398, June 27, 1944, George T. Markey, and under Trade-Mark #406,819, April 25, 1944, James Manufacturing Company.

The principal object of the present invention is to provide an incubator and hatcher of the character which is especially adapted for large machines, for example 10,000 egg capacity more or less and having means whereby all of the operations of the device are automatic except filling the trays, transferring the eggs from the incubating to hatching trays, removing the chicks from the hatching trays and manually determining the temperature and humidity desired in the cabinet at certain stages of incubating and hatching.

A further object of my invention is to provide means for efficiently circulating the air around the individual eggs, and for controlling the temperature and humidity of the air being circulated by heating and humidifying the air on the on and off principle and before it enters or reenters the tray compartment.

A still further object of my invention is to provide automatic means for turning the eggs at predetermined periods, the means being such as will not interfere with inserting and removing the incubating trays and inserting and removing the hatching trays.

Important objects of the present invention are the arrangement of air inlet and outlet valves and the manner of controlling the same whereby fresh air entering the compartment is humidified and heated before it enters and whereby air is permitted to escape from the compartment equal to the volume of admitted air, the humidostat and thermostat being located in the compartment. The arrangement of parts is such as will act to prevent overheating the eggs during the hatching period.

To these and other useful ends my invention consists of parts, combinations of parts or their equivalents and mode of operation as hereinafter described and claimed and shown in the accompanying drawings in which:

Fig. 5 is a transverse sectional view of the device taken on line 5—5 of Figure 3.

2

Figure 4:
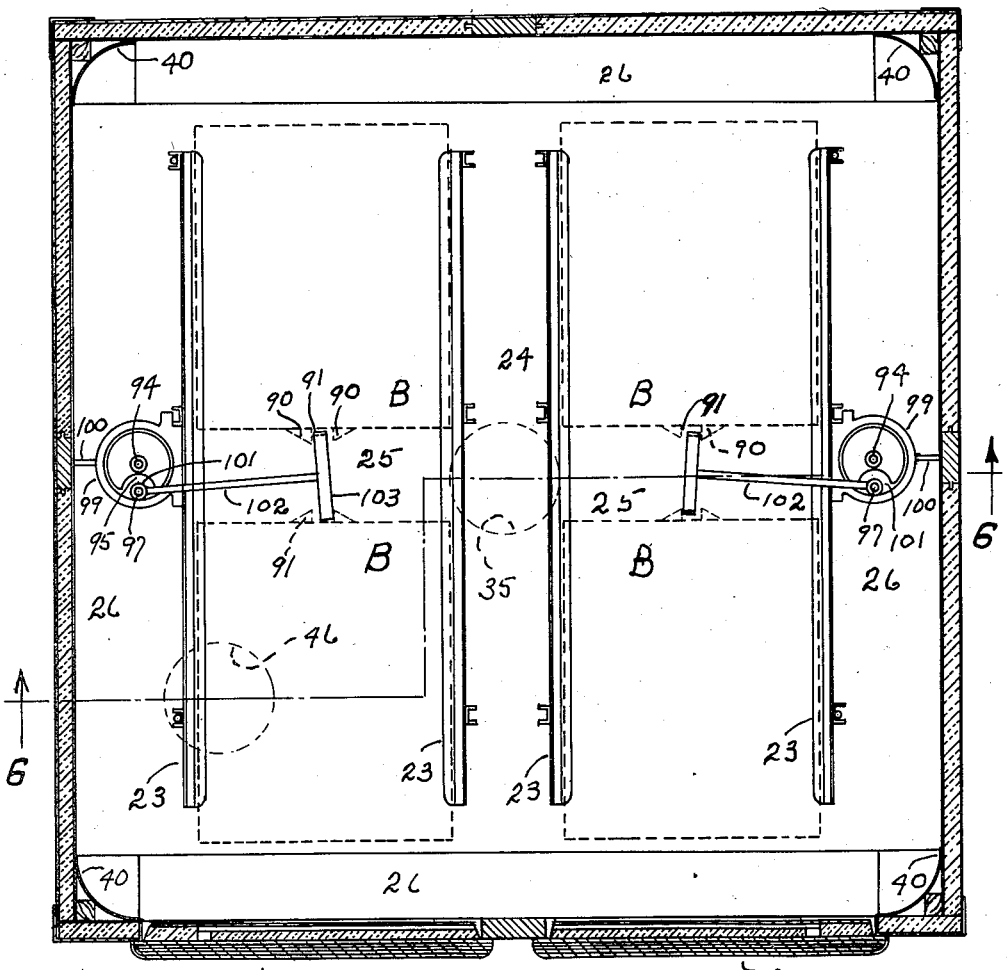
Fig. 4 is a transverse section of the device taken on line 4—4 of Figure 1.

Fig. 6 is a fragmentary vertical section through the inlet and outlet valves and illustrating the connection to the thermostat controlling means and taken on lines 6—6 of Figure 4. The valve openings are shown by superimposed dotted lines in Figure 4.

Figure 7:
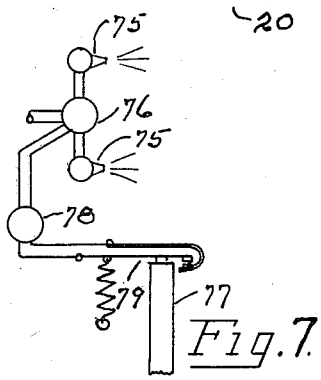

Fig. 7 is a diagrammatic drawing illustrating the humidostat, water valve and spray nozzle. The spray nozzle and valve are fractionally illustrated in Figures 2 and 5. The humidostat is positioned in the tray compartment and having means for opening the valve magnetically when the humidity in the compartment falls below normal.

Fig. 8 is a fractional top view of the preferred design of the incubating tray.

Fig. 9 is a top view of a hatching tray.

Fig. 10 is an end view of the hatching tray.

Fig. 11 is a partially sectioned end view of a hatching tray showing a fraction of an incubating tray positioned in the hatching tray and showing the eggs as having been released by an egg holding cage.

Fig. 12 illustrates fractionally how the hatching trays may be stacked.

As thus illustrated it will be seen that I have provided a walk-in cabinet having a size as illustrated in the figures, capable of incubating or hatching a large number of eggs and having means whereby all of the trays in the cabinet may be filled with fresh eggs for incubating and then transferred to hatching trays so the device may be operated on the single stage principle and without handling the individual eggs and whereby the eggs may remain in the same geographical position for each operation. The single stage principle includes incubating and hatching eggs wherein the cabinet is filled with trays of eggs and then after nineteen days all of the eggs are transferred to hatching trays and placed in the cabinet for the hatching cycle so that all of the eggs in the cabinet are at all times in the same stage of incubation and hatching. To carry out this principle, transfer of the eggs is made preferably as in my issued Patent #2,310,534, February 9, 1943.

As illustrated the cabinet in its entirety is designated by reference character A. The incubating trays in their entireties are designated by reference character B and the hatching trays in their entireties are designated by reference character C.

Figure 1:
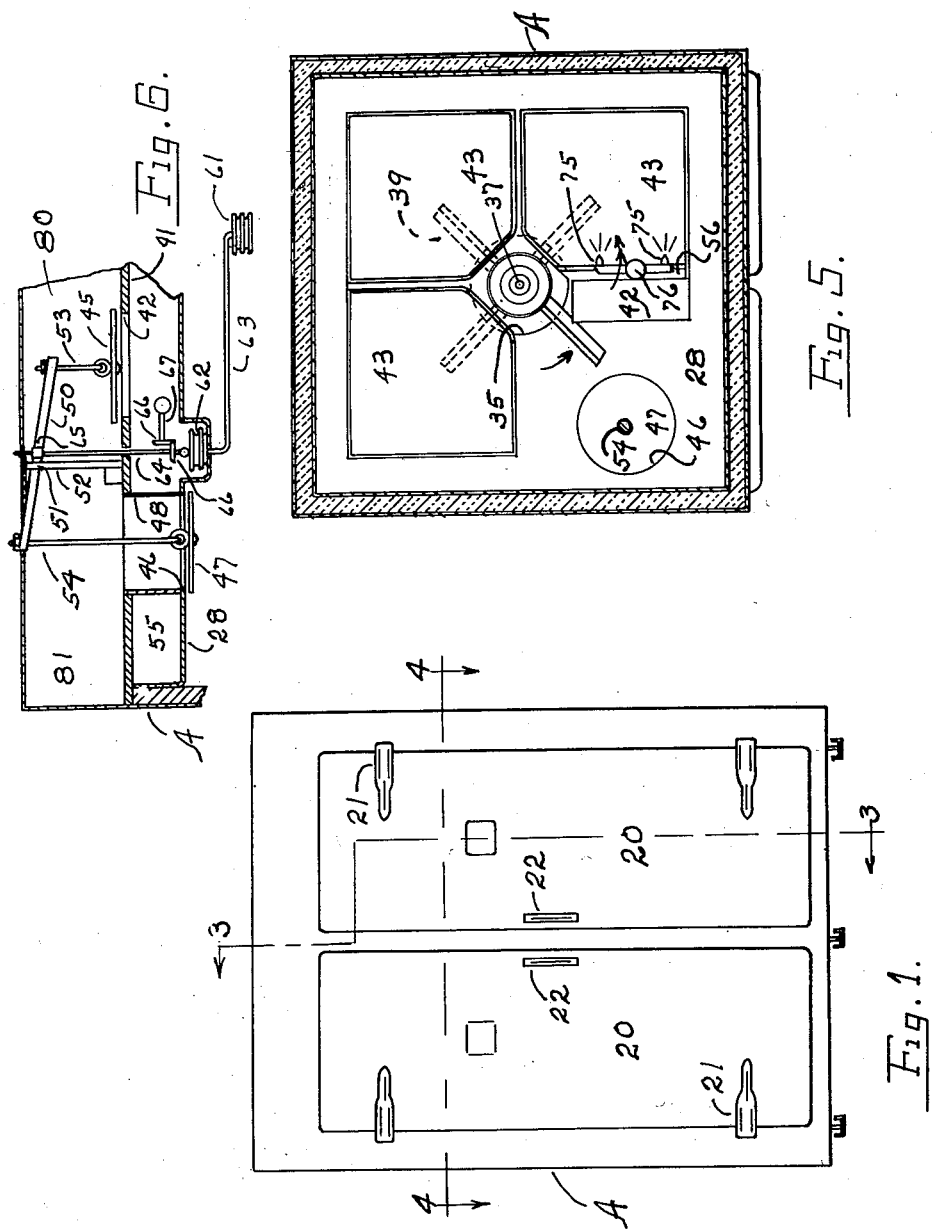
Fig. 1 is a front elevational view of my device with the ingress doors of the cabinet closed.

Applicant's device comprises a walk-in cabinet A which is designed to hold four banks of incubating trays B or hatching trays C. For this reason I have shown the cabinet as having two doors 20—20, each door being mounted on hinges 21 and having latching means 22—22. It will be understood that the hinges may be positioned as shown or they may be on the left or right side of each door. It will also be understood that if advisable a single door may be provided. Figure 1 simply illustrates the preferred arrangement of doors and mounting.

Figure 2:
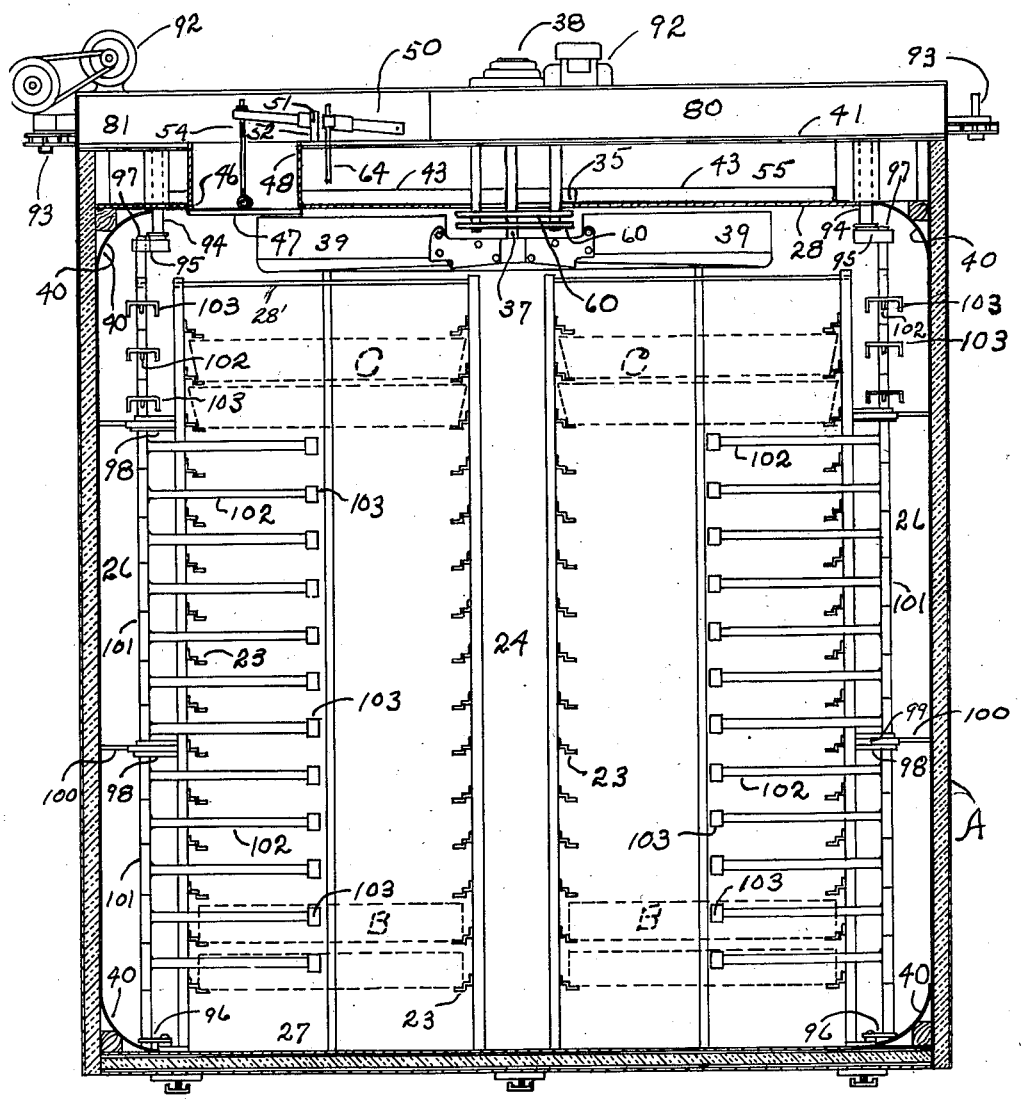
Fig. 2 is a front view of the device with the doors open, the panel above the doors being removed in order to disclose some of the operating parts.
Figure 3:
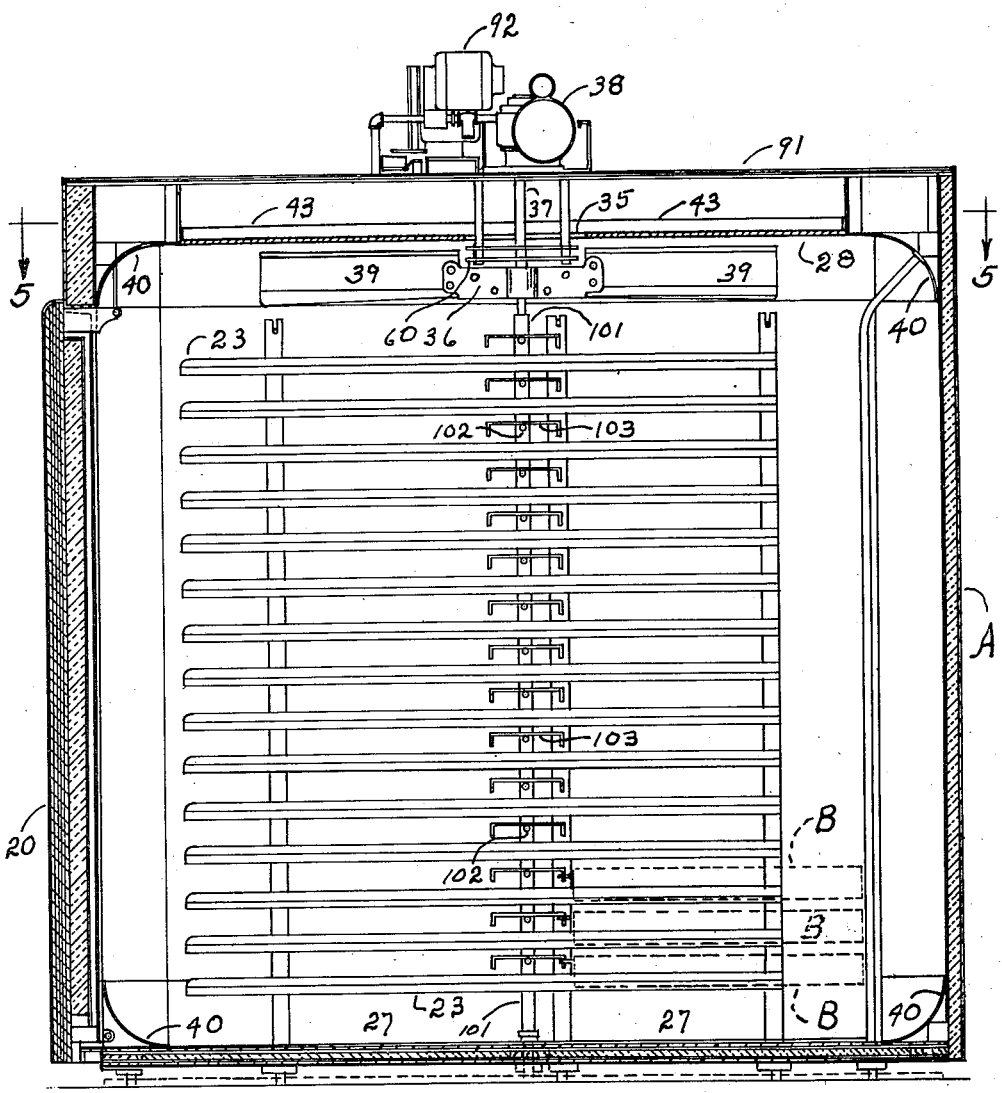
Fig. 3 is a vertical elevational section of the device taken on line 3—3 of Figure 1.

At the bottom of Figure 2 I have illustrated, by dotted lines, four incubating trays B in position in rear banks and at the top of this figure I illustrate, by dotted lines, four rear trays C in position. However when the device is in operation and operating under the single stage principle only trays B are placed in the cabinet and remain ther until the eggs have been transferred to trays C. These trays are carried by supporting bars 23 which are spaced apart vertically and positioned as shown in Figures 2 and 3.

Members B and C are positioned on bars 23 drawer-like and in four groups as illustrated in Figure 4 by dotted lines, so there are air passageways 24 and 25 between the groups, air passageways 26 at the sides and ends of the groups, and also an air passageway 27 below the groups. The tops of the groups are a distance from ceiling 28 of the compartment; in order to protect the eggs or chicks against harmful drafts I place a suitable lid 28' on the top tray of each group of trays as illustrated in Figure 2.

In the center of ceiling 28 I provide an opening 35 (see Figure 2) and position a fan 36 just below this ceiling and in close proximity thereto, the fan having a driving shaft 37 which extends vertically to a motor 38 and approximately concentric with opening 35 so air will be drawn from above the ceiling 28 by the action of the fan blades 39 and discharged outwardly in every direction.

All of the surfaces overlying the corners in the compartment of the cabinet are preferably curved as at 40. Thus it will be seen that when the fan is in operation air will be drawn into the fan through opening 35, and largely pass outwardly and then downwardly through passageways 26 and then under the banks of trays and largely through passageways 24 and 25 from whence the air will again flow into the fan. Thus the fan will act to force air into the compartment, outwardly and downwardly around the trays and then upwardly to the fan, so that air will be circulated around the eggs in the trays and outside air will be admitted and mixed with the circulating air. It will be understood that passageways 24, 25 and 26 provide means for the air to pass through the trays and around the cages because as will be noted the trays and size of the passageways are designed for this purpose.

The top cabinet cover 41 is spaced a short distance above ceiling 28. In addition to opening 35 in the ceiling I provide an opening 42. I provide three water pans 43 shaped and positioned as shown in Figure 5. I provide an air inlet opening 44 in member 41 having a valve 45 which seats on the top of the opening. I provide an opening 46 in ceiling 28 having a valve 47 which seats on the bottom of the opening (see Figure 6). Opening 46 forms an outlet from the compartment to the exterior of the cabinet through a tube 48. A lever 50 is pivoted as at 51 to a post 52 which is preferably supported on member 41, one end of lever 50 having a link connection 53 to valve 45 and the other end having a link connection 54 to valve 47; thus the valves will open and close simultaneously. The narrow chamber in which pans 43 are positioned is designated by numeral 55.

Thus it will be seen that when valves 45 and 47 are closed, the action of fan 36 will be to circulate the air in the compartment and because of the arrangement of the passageways, the circulating air will pass either downwardly or upwardly around each of the eggs in the trays. When valves 45 and 47 are opened air will be admitted into chamber 55 thru opening 42 and pass downwardly through opening 35 to the fan and into the compartment and an equal volume of air will pass out of the compartment through tube 48 to the outside of the compartment. The blades on the fan are turned in the direction of the curvilinear arrow in Figure 5.

A rectangular opening 42 is provided in ceiling 28 and the edge adjacent the pan is preferably turned downward slightly whereby additional air will be caused to move through this opening and over the pans as illustrated by a double pointed arrow in Figure 5 and in the direction the blades are moving. Therefore some air will be discharged by the action of the blades upwardly through opening 42 and over pans 43 as indicated by double pointed arrow in Figure 5 after which this air will pass over the pans and then downwardly through opening 35. Thus when valves 45 and 47 are closed a portion of the circulating air in the cabinet will be moved over the pans and then returned to the cabinet for a purpose which will hereinafter appear and when valves 45 and 47 are opened blades 39 of the fan will act to circulate the entering air and some of the compartment air over the pans.

Valve 45 is preferably positioned rear the center of the top panel 41 of the cabinet and valve 47 is preferably positioned as illustrated in Figure 5. Therefore entering outside air will be thoroughly mixed with the circulating air in chamber 55 and in the cabinet and air discharged from the cabinet will be taken from this circulating air. Clearly therefore when the heating device is not in operation the entering outside air will tend to reduce the temperature of the circulating air and when the heating device is in operation the entering outside air will be heated before being mixed with the circulating air. For the purpose I provide a heating element as follows:

I locate preferably a pair of heating elements 60—60 adjacent and below opening 35. A thermostat 61 (see Figure 6) is suitably positioned in the compartment. This thermostat may be in the form of a wafer and having a tube connection to another wafer 62 by means of a tube 63. Wafer 62 is operatively connected to lever 50 by means of a link 64. Link 64 is preferably screw-threaded in a block 65 which is pivoted to lever 50. Member 64 is rotatably mounted in its connection to member 62 and having preferably a pair of beveled pinions 66 with a shaft 67 which extends to the exterior of the cabinet whereby the operator can change the temperature at which valves 45 and 47 will be opened or closed.

Heating elements 60 are connected to an on and off switch (not shown) which is controlled by a thermostat (not shown) having means for controlling the temperature on the on and off principle as is the custom in incubators and hatchers, similar to the means illustrated in Figures 5 and 6 in my issued Patent No. 2,267,244 December 23, 1941. Such device is too well known to require further illustration or description. Thus between heating element 60 and valves 45 and 47, the temperature in the cabinet will be positively controlled. I provide means for maintaining and controlling the humidity in the tray compartment as follows:

Spray nozzles 75—75 are positioned over the inlet side of pans 43, the nozzles being connected to a magnetically operated inlet valve 76 with a source of water supply and a connection to a humidostat 77 through a relay 78 and circuit contact switch 79 whereby when the humidity in the compartment drops below a predetermined point the valve will be opened and water sprayed into the air passing over the pans from inlet 42 or from valve 45. The humidostat is preferably located in the upper end of air passageway 24 and in the transverse center thereof. When the humidity reaches the desired point in the cabinet, the humidostat will cause valve 76 to close. Pans 43 will act to catch any water not vaporized by its first contact with the air. Thus generally at least the pan nearest opening 42 will always have some water in it and generally there will be some water in the second pan in the circuit, or even in the third, the arrangement being such as will insure against carrying water particles to opening 35.

It will be seen that the temperature and humidity of the air in the cabinet are at all times under the control of the thermostat and humidostat. I may provide an inlet air duct 80, an outlet air duct 81, duct 80 communicating with valve 45 and duct 81 communicating with outlet tube 48. Thus if it is desired air may be supplied to the cabinet from the exterior of the building and air may be discharged from the compartment to the exterior of the building.

Clearly when the temperature in the compartment is above the desired point, the action of thermostat 61 will be to permit fresh air to enter and mix with the circulating air and an equal volume will be discharged from the compartment, thus to insure against overheating the eggs especially during the hatching period when there is considerable body heat supplied by the chicks.

It will be seen that by the arrangement of my humidifying device that humidity of the circulating air will be maintained at the desired point and that the ordinary manual controls for the thermostat and humidostat will definitely be under the direct control of the attendant. Generally a chart is supplied which informs the attendant the exact temperature and humidity desired for different stages of incubating and for the hatching period so that a person of ordinary intelligence can secure the best results or the highest percentage of hatched eggs.

I have illustrated in Figures 8, 9, 10, 11 and 12 the preferred design for the incubating and hatching trays. The frame of the incubating trays is designated by reference numeral 85 and the egg holding cages are designated by numeral 86. In Figure 11 the incubating tray is shown positioned in a hatching tray and after the eggs have been released so when the incubating tray is removed the eggs will lay on the bottom of the hatching tray in the same geographic position they were in in the incubating tray and in the cabinet as illustrated in my Patent #2,352,398, the purpose for which is fully described in this patent. I provide means for rocking the cages back and forth at predetermined intervals as follows:

A sliding device 89 on the end of each tray is operatively connected to each cage, each member 89 having projections 90—90 forming a depression 91 (see Figure 4). The preferred operating connection between members 89 and the cages is illustrated in my issued Patent #2,352,398 June 27, 1944, or as illustrated in my issued Patent #2,310,534 February 9, 1943.

Motors 92 are adapted to drive a vertical shaft 93 at a reduced speed. One of these mechanisms being located on opposite sides of member A, each motor having an operating connection to a shaft 94, this shaft at its bottom having a crank 95. At the bottom of member A a shaft is positioned in alignment with shafts (not shown) 94 having cranks 96, the free ends of which are in alignment with the free end of crank 95. Shafts 97—97 are secured to the free ends of cranks 95 and 96. In order to stabilize shafts 97 I provide spaced eccentrics 98 having straps 99 which are anchored to the side walls of the cabinet by means of an arm 100. Thus shafts 97 may turn in circles around shafts 94. On shafts 97 I mount a number of tubes 101, one for each horizontal in alignment pair of trays, each tube 101 having secured thereto an arm 102, the arms on their inner ends having secured thereto inverted U-shaped members 103.

Inverted U-shaped members 103 are adapted to fit loosely within depressions 91, each member 89 having means to engage an adjacent cage so when member 89 is moved in one direction or the other the cage will be tilted similar to the ones shown in the above referred to patent.

Thus it will be seen that as shafts 97 rotate around shafts 94 as axes, arms 102 will be moved back and forth by shafts 97. Motor 92 is operatively connected to the power circuit by means of a switch adapted to turn shafts 94 180° at each operation and this controlling means is adapted to stop the motor when shafts 97 are at their furthest outward or inward position, the outward position being shown in Figure 2. Thus when shafts 97 are in the position shown in Figure 2 the cages will be rocked in one direction and when shafts 97 are stopped on their inner position the cages will be rocked in the other direction. Generally the motor controlling device is adapted to turn shafts 94 one half turn at two hour intervals or less.

In Figure 4 shafts 97 are shown in a medial position or in the position when the trays are not rocked in either direction.

When trays B are loaded and placed in position the rear trays are first inserted, arms 102 are then swung so members 103 lay in depressions 91. The front trays are then placed in position as shown at the left of Figure 4. When it is desired to transfer the eggs from trays B to trays C a front tray is first removed and member 102 swung forwardly into passageway 26 after which the rear tray is removed and eggs in the two trays are transferred to trays C, and trays C are then placed in position in the compartment for the hatching operation.

It will be seen that when the eggs are transferred they may be left in the same geographical position in the compartment and under the same environment as they were in while being incubated thus no harmful change can take place either in air circulation or heat and humidity of the air around each egg.

Obviously there may be a slight variation in temperature and humidity around individual eggs, therefore it is advisable to keep the eggs in the same environment while being incubated and hatched. In my device generally the eggs in each pair of trays are moved to a hatching tray simultaneously and the operation continued until all have been transferred as outlined.

In my device I use thermostats and humidostats and other controlling means which are standard products manufactured by reputable concerns and therefore it is not thought necessary to show and describe these parts in detail.

Clearly many minor detailed changes can be made in the design shown without departing from the spirit and scope of my invention as recited in the appended claims.

Having thus shown and described my invention I claim:

1. An incubator and hatcher of the character described comprising in combination, four vertical walls having a ceiling and floor forming a rectangular in horizontal section housing, four groups of vertically spaced egg holding trays positioned in said housing, the groups of trays being horizontally spaced apart, their outer sides positioned a short distance from said side walls and their tops and bottoms positioned a short distance from the ceiling and floor of the housing, covers positioned on top of the top tray of each group of trays, said ceiling having an inlet opening positioned horizontally concentric with the inner corners of said groups of trays, a vertically arranged concentrically positioned, rotatably mounted shaft in said ceiling opening having on its upper end driving means, a fan secured to the lower end of said shaft, its blades being positioned between said covers and ceiling, said blades being adapted to centrifugally discharge air outwardly in all directions and receive air from said ceiling opening and from the space between the inner corners of said groups of trays.

2. A device as recited in claim 1 including, a plate positioned a short distance above said ceiling and being connected to the walls of the enclosure forming a secondary enclosure above the ceiling, an outlet duct extending from said cabinet through said secondary enclosure, an outside air inlet in said plate, said outlet duct and outside air inlet having valves with a connection therebetween for simultaneous movement in opposite directions, a thermostat in said housing in the path of the returning air in the housing having an operating connection to said valve connection for controlling the temperature in the cabinet by controlling the inlet of outside air and the outlet of inside air and thereby regulate the temperature of circulating air in the cabinet.

3. A device as recited in claim 1 including, an electric heater unit positioned in said ceiling opening for heating the air passing therethrough.

4. A device as recited in claim 2, including, water pans positioned on said ceiling and occupying the lower part of the space between the ceiling and said plate, an opening in the ceiling adjacent the forward edge of the pan end on the side thereof toward which the blades of said fan move, whereby air will be forced above and over the pan and permitted to return into the fan, a water spray nozzle having a valve positioned over the air inlet side of the pan, a humidostat positioned in said cabinet having a connection to said last valve, for controlling the humidity of the air passing over said pan.

GEORGE T. MARKEY.

REFERENCES CITED

The following references are of record in the file of this patent:

UNITED STATES PATENTS

| Number | Name | Date |
|---|---|---|
| 1,322,161 | Calow | Nov. 18, 1919 |
| 1,330,721 | Riddle | Feb. 10, 1920 |
| 1,796,872 | Markey | Mar. 17, 1931 |
| 2,020,133 | Brace | Nov. 5, 1935 |
| 2,086,813 | Markey | July 13, 1937 |
| 2,152,492 | Needels | Mar. 28, 1939 |
| 2,184,685 | Brace | Dec. 26, 1939 |
| 2,310,534 | Markey | Feb. 9, 1943 |
| 2,364,722 | Kazantzeff | Dec. 12, 1944 |
| 2,375,688 | Quatman | May 8, 1945 |
| 2,376,641 | Waterman | May 22, 1945 |
| 2,433,655 | Zoppola | Dec. 30, 1947 |